United States Patent [19]

Schwien

[11] Patent Number: 4,779,464
[45] Date of Patent: Oct. 25, 1988

[54] MANOMETER

[75] Inventor: L. Nevin Schwien, Aspen, Colo.

[73] Assignee: Schwien & Son, Inc., Aspen, Colo.

[21] Appl. No.: 41,159

[22] Filed: Apr. 22, 1987

[51] Int. Cl.$^4$ .............................. G01L 19/04
[52] U.S. Cl. .......................... 73/708; 73/747
[58] Field of Search ............ 73/747, 708, 749, 750

[56] References Cited

U.S. PATENT DOCUMENTS

| 3,225,599 | 12/1965 | Schwien ........................ 73/749 |
| 4,155,248 | 5/1979 | Wagner et al. .................. 73/38 |
| 4,563,892 | 1/1986 | D'Aoust ........................ 73/19 |

OTHER PUBLICATIONS

Schwien et al., "Dual Cistern Manometry", Measurements & Control, Oct. 1980.

Primary Examiner—Tom Noland
Assistant Examiner—Robert R. Raevis
Attorney, Agent, or Firm—Chester E. Martine, Jr.

[57] ABSTRACT

A dual cistern manometer having a vertically extending manometer assembly is designed to reduce the temperature gradient along a vertical axis. The assembly is housed in a cylindrical chamber that is itself surrounded by an outer cylindrical enclosure. The enclosure is coaxial with and spaced from the chamber cylinder to form a first annular return air duct. A first annular wall extends across the top of the cylindrical chamber and is supported by the cylindrical enclosure. A second, annular wall secured to the top of the chamber cooperates with the first wall to define a second, annular return air duct having a continuously curved shape for directing upwardly flowing air from the measurement chamber outwardly and downwardly into the first annular return air duct. The lower end of the first return air duct is curved and joins a plenum that supplies air to the bottom of the measurement chamber for upwardly flow over the manometer assembly to reduce the temperature gradient along the dual cistern structure of the manometer. The manometer assembly includes spaced, vertical columns that guide a horizontal bridge that carries a movable cistern of a dual cistern type manometer assembly.

13 Claims, 5 Drawing Sheets

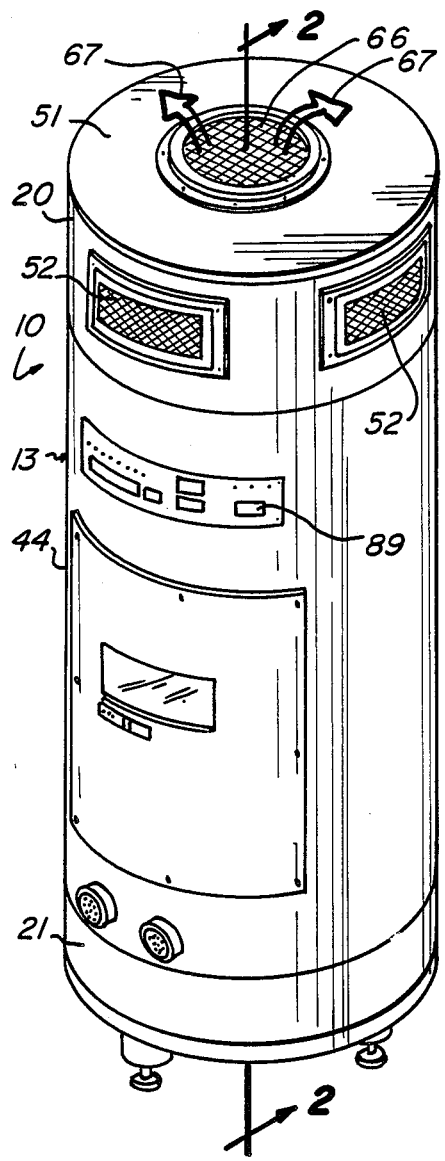
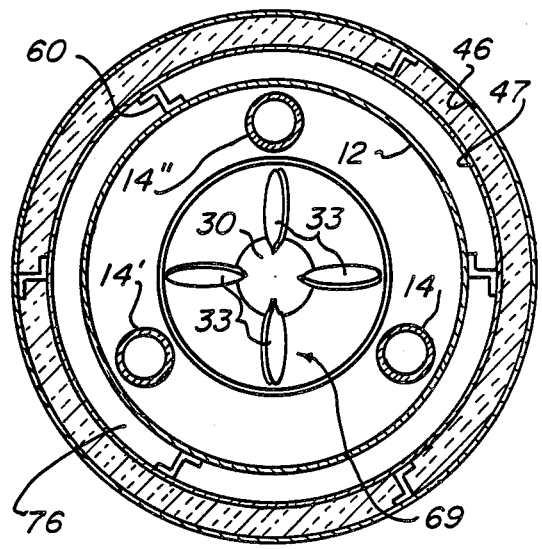
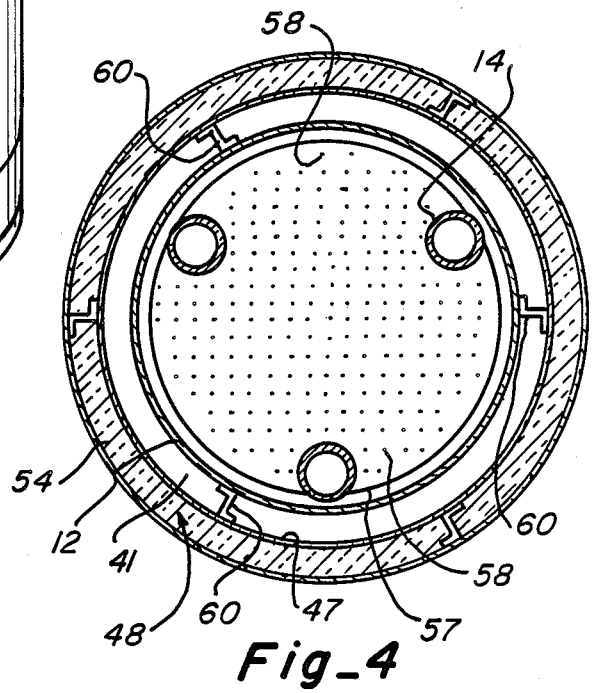
Fig_1
Fig_3
Fig_4

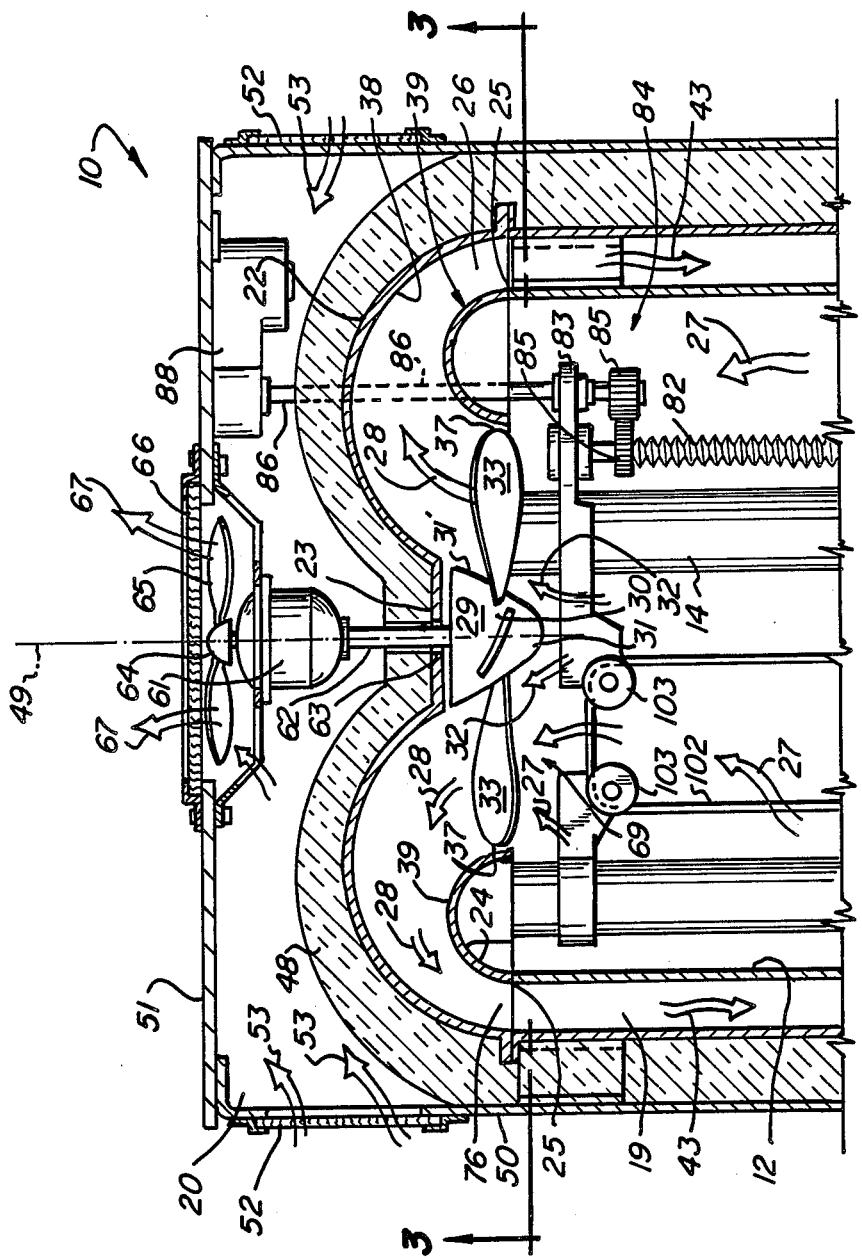

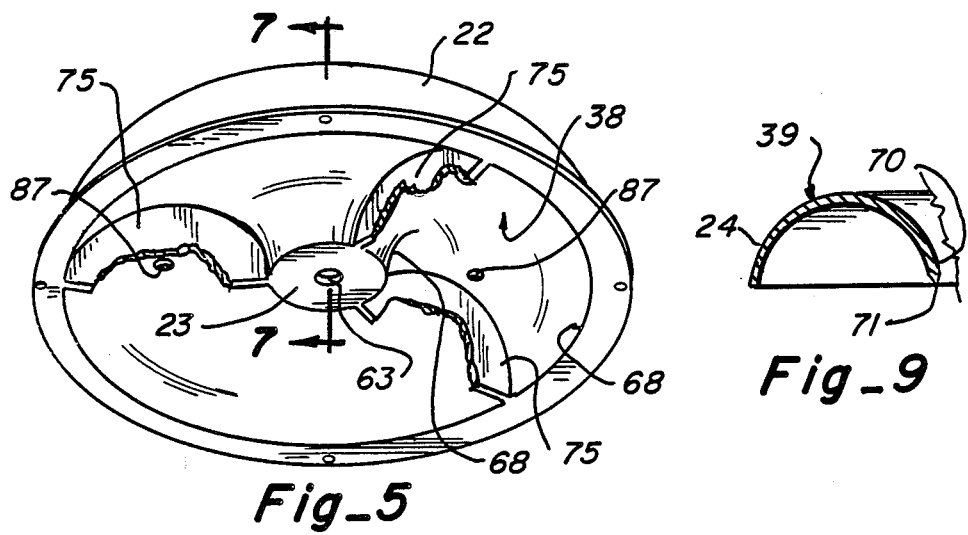
Fig_5
Fig_9
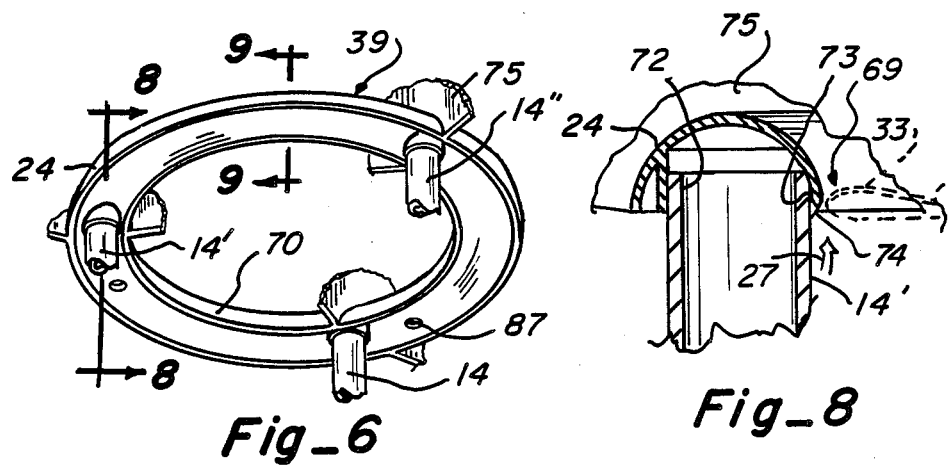
Fig_6
Fig_8
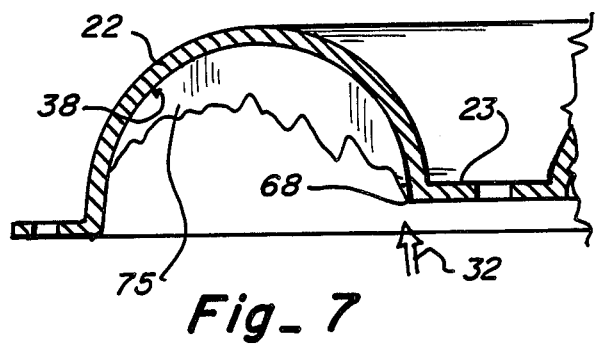
Fig_7

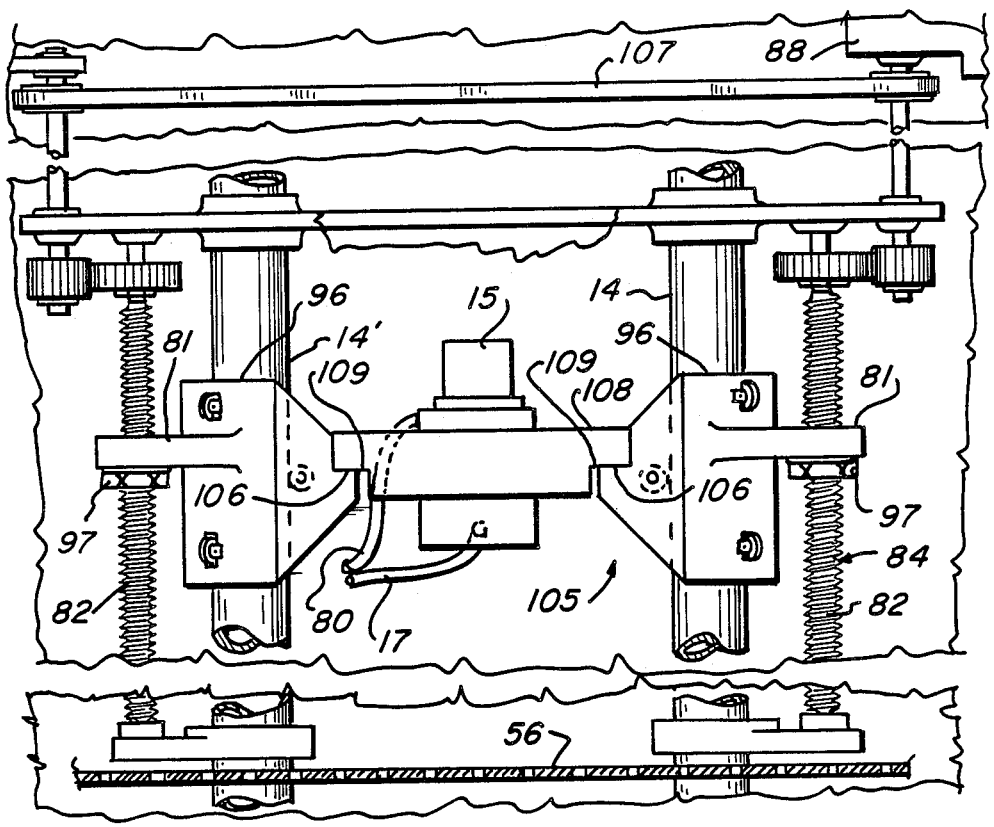
Fig_10

MANOMETER

BACKGROUND OF THE INVENTION

1. Field of the Invention

The present invention relates to manometers and more particularly to manometers provided with improved air flow across a manometer assembly within a measurement chamber.

2. Description of the Prior Art

The dual cistern manometer was developed to avoid the meniscus vagaries attendant with mercury in glass tubes. For example, see U.S. Pat. No. 3,225,599 issued Dec. 28, 1965 to L. M. Schwien for a Manometer. Approximately 1,200 of such dual cistern manometers have been built. In the early 1980's, it was discovered that particularly in the measurement of low pressures, the mercury line contained in a stainless steel bellows hose was lying on a metal base which was often at an appreciably different temperature. Secondary errors were also encountered due to the use of a transparent front of the casing.

As the vertical height of manometers has been increased to achieve greater accuracy, the change in the temperature of the manometer along such height, or temperature gradient, has introduced new inaccuracies. To reduce temperature gradient-induced inaccuracies, it has been suggested that the temperature gradient itself be minimized. While some causes of temperature gradient have been eliminated, air-related causes of temperature gradient are more difficult to eliminate.

It has been suggested that a rectangular, outer, highly insulated shell be spaced from a rectangular, inner, measurement chamber, to provide an air curtain which recirculates the air from the top to the bottom of the inner rectangular chamber on all four sides. The air is drawn over an electrical resistance heater within a squirrel cage blower which is rotated about a vertical axis at the top of the inner chamber by an external motor. The air is heated by a thermal control system governed by the temperature of a flexible mercury line connecting vertically spaced cisterns that contain mercury. The temperature probe is at the mid-point of the mercury line. In tests of this structure, it has been found that the rectangular shell and the walls of the rectangular inner chamber resonate and interfere with the accuracy of the manometer reading. Isolation of the squirrel cage blower from the shell and chamber indicate that such resonance is not solely due to mechanical vibration within the squirrel cage blower.

Also, as the vertical height of manometers has been increased, it has been difficult to keep a column straight and vertical in the measurement chamber. As disclosed in U.S. Pat. No. 3,225,599, one such column and an adjacent threaded lead screw have cooperated to guide and adjust the vertical location of a movable cistern. Ideally, the column is straight and vertical so that the free surface of the mercury inside the movable cistern is horizontal. When the column is bowed or not vertical, a collar that rides along the column becomes tipped such that the movable cistern mounted on the collar is not level. With the movable cistern out of level, the free surface of the mercury is not horizontal, which interferes with the accurate operation of the manometer.

SUMMARY OF THE INVENTION

In contrast to prior manometers in which dual, rectangular walls resonate in response to air flow between the walls, it is an object of the present invention to reduce the temperature gradient within a measurement chamber of a manometer without introducing additional sources of inaccuracy.

A manometer having reduced temperature gradient characteristics according to the principles of the present invention is designed to provide low flow rate (low turbulence) air movement in the measurement chamber across the manometer assembly; to avoid resonance and other vibration of an outer enclosure, the manometer chamber and the manometer assembly; to have the enclosure be movable; and to minimize the temperature gradient of the manometer assembly in the measurement chamber without using an internal heater.

A manometer according to one embodiment of the present invention is less sensitive to the bowing or positioning of the column that is used for guiding a collar that supports the movable cistern. In this embodiment, two such columns are vertically mounted and spaced from each other. Each column is adjacent a separate lead screw. A collar movably mounted on each column is moved vertically by its lead screw. To minimize inaccuracies caused by bowing of one or both of the columns or by one or both columns not being vertical, the movable cistern is mounted on a horizontal bridge that extends between the collars. Also, the lead screws are driven by the same drive so that the bridge, and thus the movable cistern, stays horizontal as it moves up and down.

With these objects in mind, one embodiment of the present manometer includes a manometer assembly provided with a vertically elongated column for guiding a first cistern for movement relative to a second vertically spaced, fixed cistern. The cisterns carry pools of mercury. An elongated flexible mercury carrying line is provided for interconnecting the cisterns.

In a preferred embodiment of the present manometer, the manometer assembly includes a second vertically elongated column provided spaced from the other column. Separate lead screws driven by a common drive move a collar along each column. A bridge extends horizontally across the collars for horizontally supporting the first cistern with a free surface of the mercury pool level. A chamber cylinder defines a measurement chamber that surrounds the lead screws, the columns, the cisterns and the line. A cylindrical enclosure is coaxial with and surrounds the chamber cylinder for defining a first annular return air duct. The enclosure extends above and below the chamber cylinder for defining respective upper and lower, closed enclosure sections. A first, annular wall extends across the cylindrical enclosure for separating the upper closed enclosure section from the measurement chamber. The first wall has a central, disk-shaped section extending partially across the chamber. A second, annular wall is secured to a top of the chamber cylinder for cooperating with the first wall to form a second, annular return air duct having a continuously curved, U-shape. Air flowing upwardly in the measurement chamber is directed outwardly and downwardly by the second return air duct into the first return air duct.

A blower is rotatably supported on the disk-shaped section. The blower includes a hub having a faired leading surface covering the disk-shaped section for guiding the upwardly flowing air into the second duct. The blower includes propeller-type blades secured to the hub and extending across the second return air duct for drawing air upwardly around the hub and blowing it into the second duct and then into the first duct. The lower enclosure section is provided with a curved lower duct that supplies air to a plenum below the measurement chamber. Air flows upwardly from the plenum into the measurement chamber for flow across the structure of the manometer assembly.

The blower is operated at relatively low speed so that blade-induced turbulence is minimized. In the preferred embodiment, the horizontal cross section of the measurement chamber is large enough to permit steady, relatively laminar air flow upwardly in the measurement chamber and around the columns, the cisterns, the lead screws and the line to reduce the temperature gradient thereof with respect to the vertical location thereof in the measurement chamber. Further, the faired surface of the hub and the continuously curved surfaces of the first and second annular walls substantially reduce turbulence of the air flowing in the second duct to the first annular return air duct. The air flows relatively smoothly from the first duct to the plenum because of the curved lower duct. As a result, relatively low turbulence is caused in all of the air paths within the enclosure, to minimize air-induced vibration and promote heat transfer as the air flows upwardly from the plenum across the structure of the manometer assembly.

BRIEF DESCRIPTION OF THE DRAWINGS

Other objects, features and advantages of the present invention will be apparent from an examination of the following detailed description and the attached drawings, in which:

FIG. 1 is a three-dimensional view of a cylindrical enclosure that surrounds a cylindrical measurement chamber that houses a manometer assembly;

FIGS. 2A and 2B combine to form a vertical cross-sectional view taken along line 2—2 in FIG. 1 showing the cylindrical enclosure and the cylindrical measurement chamber, and depicting a continuously curved upper air duct for directing air from the measurement chamber into a vertical, annular duct and then to a curved lower duct for directing air into a plenum for return to the measurement chamber;

FIG. 3 is a horizontal cross-sectional view taken along line 3—3 in FIG. 2A showing blades of a blower that force air from the measurement chamber, through the upper, vertical and lower ducts for return to the bottom of the measurement chamber;

FIG. 4 is a horizontal cross-sectional view taken along line 4—4 in FIG. 2B showing a vented plenum divider that distributes air from the plenum into the cylindrical measurement chamber;

FIG. 5 is a three-dimensional view of a first annular wall that separates the measurement chamber from the rest of the cylindrical enclosure;

FIG. 6 is a three-dimensional view of a second annular wall that cooperates with the wall shown in FIG. 5 to form the upper air duct;

FIG. 7 is a cross-sectional view taken along line 7—7 in FIG. 5 showing the inverted-U-shape of the first, annular wall;

FIG. 8 is a cross-sectional view taken along line 8—8 in FIG. 6 showing the second, annular wall having a socket for receiving a column of the manometer assembly;

FIG. 9 is a cross-sectional view taken along line 9—9 in FIG. 6 showing a faired leading edge of the second annular wall; and FIG. 10 is a partial vertical cross-sectional view similar to FIGS. 2A and 2B showing a preferred embodiment of the present invention in which the cylindrical measurement chamber houses a pair of vertical columns that guide collars in response to rotation of a pair of lead screws, so that a movable cistern mounted on a horizontal bridge between the collars is moved vertically in the operation of the manometer.

DETAILED DESCRIPTION OF THE PREFERRED EMBODIMENT

Figure 2B:
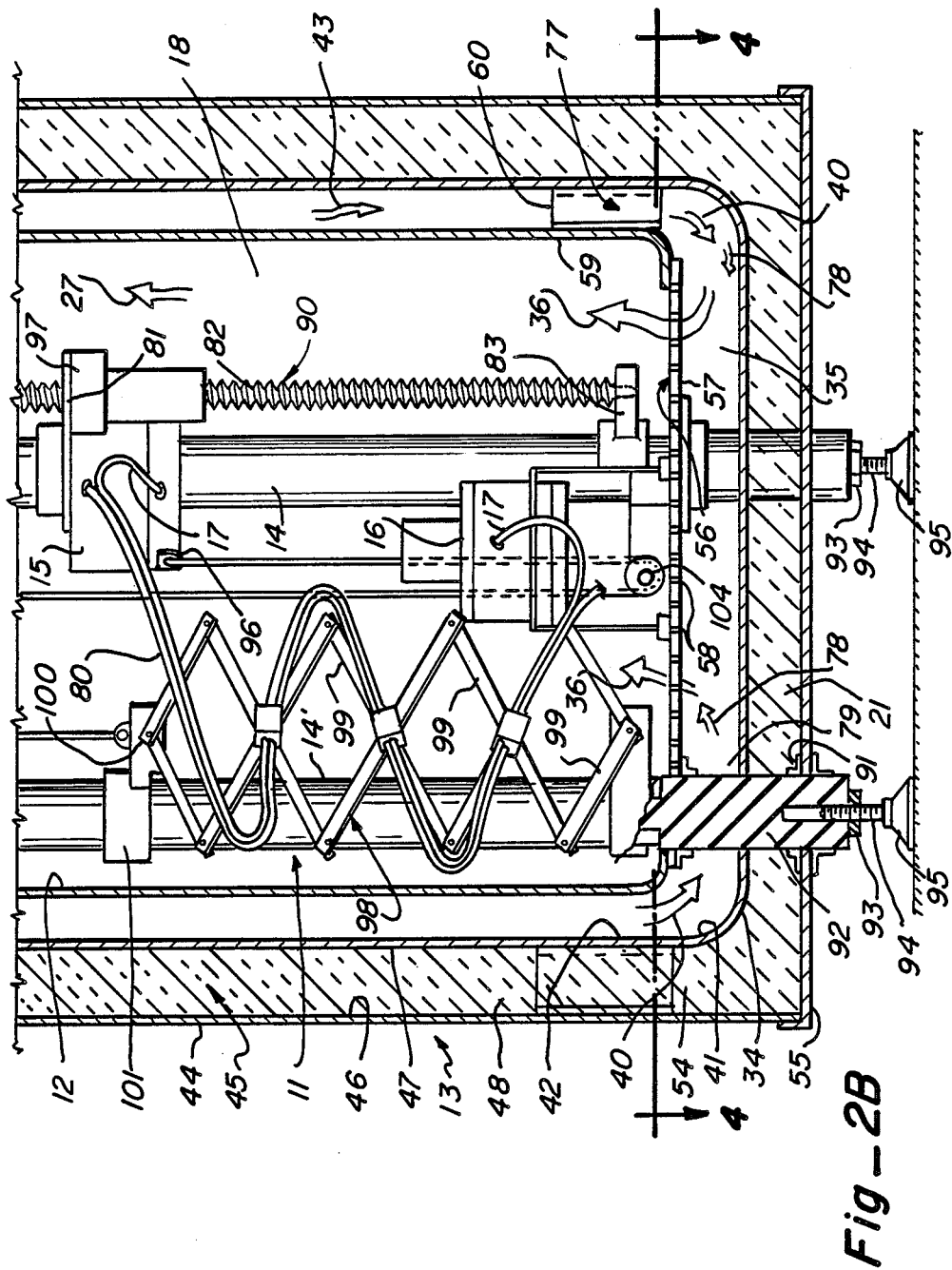

Referring to FIGS. 2A and 2B of the drawings, a manometer system 10 of the present invention is shown including a manometer assembly 11 housed in a chamber cylinder 12 that is surrounded by a cylindrical enclosure 13. The manometer system 10 includes a vertically elongated column 14 for supporting a first cistern 15 for movement relative to a second vertically spaced cistern 16. The cisterns 15 and 16 carry pools of mercury. An elongated flexible mercury carrying line 17 is provided for interconnecting the cisterns 15 and 16.

The chamber cylinder 12 surrounds the column 14, the cisterns 15 and 16 and the line 17 and defines a measurement chamber 18 (see FIG. 2B). The cylindrical enclosure 13 is coaxial with and surrounds the chamber cylinder 12 for defining a first annular return air duct 19. The enclosure 13 extends above and below the chamber 12 for defining respective upper and lower, closed enclosure sections 20 and 21. A first, annular wall 22 extends across the cylindrical enclosure 13 for separating the upper closed enclosure section 20 from the measurement chamber 18. The wall 22 has a central, disk-shaped section 23 extending partially across the measurement chamber 18. A second, annular wall 24 is secured to a top 25 of the chamber cylinder 12 for cooperating with the first wall 22 to form a second, annular return air duct 26 having a continuously curved, inverted-U-shape for directing upwardly flowing air (see arrows 27) outwardly and downwardly in an upper return air path (see arrows 28—28) into the first return air duct 19.

A blower 29 is rotatably supported on the diskshaped section 23. The blower 29 includes a hub 30 having a faired leading surface 31 covering the disk-shaped section 23 for guiding the upwardly flowing air 27 around the hub 30 (shown by arrows 32). A trailing edge 31' of the hub 30 assists in guiding the air flow 32—32 into the second duct 26. The blower 29 includes propeller-type blades 33—33 (see also FIG. 3) secured to the hub 30 and extending across the second return air duct 26 for drawing air from the chamber 18 (shown by arrows 27 and 32) upwardly around the hub 30 and forcing it (shown by arrows 28—28) into the second duct 26 for flow into the first return air duct 19.

The lower enclosure section 21 is provided with a curved lower duct 34 that supplies air to a plenum 35 below the measurement chamber 18 (see FIG. 2B). Air flows upwardly (see arrows 36—36) from the plenum 35 into the measurement chamber 18 for flow across the manometer assembly 11, including the column 14, the cisterns 15 and 16 and the line 17. The blower 29 is operated at low speed (e.g. 1000 rpm) such that outer tips 37—37 of the blades 33—33 have a relatively low rotary speed so that blade-induced turbulence is minimized.

The horizontal cross-section of the measurement chamber 18 is large enough to permit steady, relatively laminar air flow upwardly in the measurement chamber 18 (see arrows 36—36 and 27—27) and around the manometer assembly 11, including the column 14, the cisterns 15 and 16 and the line 17, to reduce the temperature gradient thereof with respect to the vertical location thereof in the measurement chamber 18. Further, the faired surface 31 of the hub 30, and continuously curved surfaces 38 and 39 of the first and second annular walls 22 and 24, substantially reduce turbulence of the air flowing in the upper return air path 28 to the first annular return air duct 19. The air flows relatively smoothly in a lower return path (see arrows 40—40) from the duct 19 to the plenum 35 because of a continuously curved surface 41 of the lower duct 34 that starts at the bottom 42 of the first annular duct 19. As a result, relatively low turbulence is caused in the air paths 28—28 and 40—40 and in an air path (see arrows 43—43) in the first duct 19. The air pressure is thus relatively steady in the plenum 35 so that the air flows smoothly in the vertical paths 36—36 upwardly from the plenum 35 across the manometer assembly 11.

Referring now in detail to FIGS. 2A and 2B, a first preferred embodiment of the present invention is shown including the manometer assembly 11 in the measurement chamber 18 within the cylindrical enclosure 13. The enclosure 13 includes the upper enclosed section 20, a central section 44 and the lower enclosed section 21. The sections 20, 21, and 44 are formed by an outer cylindrical shell 45 composed of spaced cylindrical walls 46 and 47 filled with insulation 48. The insulation 48 limits radiant and conductive heat transfer to the manometer assembly 11. The outer cylindrical shell 45 is formed around a vertically extending longitudinal axis 49. The central section 44 surrounds, is spaced from and is concentric with the chamber cylinder 12.

Referring to FIGS. 1, 2A and 2B, the upper enclosed section 20 is formed from an upper extension 50 of the outer cylindrical shell 45 and a top 51 that closes the upper section 20. The shell 45 of the upper section 20 of the enclosure 13 is provided with vents 52—52 to allow ambient air to flow (see arrows 53—53) from and to the upper section 20 of the enclosure 13.

Referring again to FIGS. 2A and 2B, the lower section 21 of the enclosure 13 is formed from a lower cylindrical extension 54 of the outer cylindrical shell 45 and a base 55 that closes the lower section 21.

The measurement chamber 18 is defined by the chamber cylinder 12 and is thus provided with a cylindrical shape. The chamber cylinder 12 is also formed around the longitudinal axis 49. A bottom 56 of the measurement chamber 18 is defined by a plenum divider 57 (see FIG. 4 also) provided with spaced vents 58—58. A wall 59 of the chamber cylinder 12 extends upwardly from the divider 57 parallel to and spaced from the shell 45. The wall 59 is maintained in such spaced relationship with the shell 45 by a series of thin vertical webs 60—60 (see FIG. 4) that extend radially from the chamber cylinder 12 to the inner wall 47 of the shell 45 at regular intervals. The space, or first annular return air duct 19, formed between the shell 45 and the chamber cylinder 12 is thus annular and extends vertically throughout the length of the measurement chamber 18. The wall 59 of the chamber cylinder 12 terminates at the top 25 which forms an upper support surface.

For housing the dual cistern manometer assembly 11 of the first preferred embodiment of the present invention, the outer diameter of the shell 45 is about forty inches and the inner diameter of the wall 59 of the chamber cylinder 12 is thirty inches. Accounting for the thickness of the walls 46 and 47, the insulation 48 and the thickness of the wall 59 of the chamber cylinder 12, the space or first annular duct 19 between the inner wall 47 of the shell 45 and the outside of the wall 59 of the chamber cylinder 12 is about three inches measured radially from the longitudinal axis 49. This provides the first return air duct 19 with a cross-sectional area of about 311 square inches, which compares to that of the chamber cylinder 12 which has a cross-sectional area of about 706 square inches. Taking into consideration the reduction in the cross-sectional area of the chamber cylinder 12 by the area of the manometer assembly 11 that is inside the chamber cylinder 12, the cross-sectional area of the first return air duct 19 is sufficiently close to the net air flow area within the chamber cylinder 12 to avoid the resonance that occurred in the rectangular shell structure of the prior art.

The blower 29 is shown in FIG. 2A including a motor 61 supported on the top 51. The motor 61 drives a shaft 62 that extends downwardly into a bearing 63 in the center disk 23. The hub 30 is secured to the shaft 62 for rotating the blades 33-33.

An upper end 64 of the shaft 62 extends upwardly from the motor 61 and drives a fan 65, such as a ventilating fan, that draws air through the vents 52—52 and into the upper enclosure 20 for flow out of a vent 66 (see also FIG. 1) provided in the top 51 (see arrows 67). This air flow removes the heat generated by the motor 61 from the upper enclosure 20 so that heat will not be transferred through the insulation 48 and the wall 22 into the measurement chamber 18.

Still referring to FIGS. 2A and 2B and referring also to FIGS. 5-9, the second annular return air duct 26 is shown having the continuously curved surfaces 38 and 39. The surface 38 terminates in an annular section or leading edge 68 (see FIGS. 5 and 7) that is parallel to the trailing edge 31 of the hub 30 (FIG. 2A). The section 68 allows the air flow 32—32 over the trailing edge 31 of the faired surface 31 (FIG. 2A) to smoothly enter the second duct 26 through an annular opening 69 (FIGS. 3 and 8) that is formed between the annular section 68 and an opposite vertical terminus or leading edge 70 (FIG. 9) of the continuously curved surface 39. A fairing 71 (FIG. 9) is provided at the lower end of the terminus 70 for guiding the air flow 27—27 through the opening 69 and smoothly past the vertical terminus 70 into the second, annular return air duct 26. The column 14 and a column 14' and a column 14'' (FIG. 6) spaced therefrom support the second, annular wall 24 from beneath as shown in FIGS. 2A and 6. As shown in FIG. 8, the column 14' is mounted vertically in the measurement chamber 18 and has an upper end 72 that is received in a socket 73 for supporting the annular wall 24. The socket has a rounded leading edge 74 for guiding the air flow 27-27 into the opening 69. The columns 14 and 14' support the annular wall 24 in a similar manner at locations spaced 120° from the column 14''.

In the first preferred embodiment of the present invention, at each location at which the annular wall 24 is supported by one of the columns 14, 14' and 14'', a rib 75 (FIGS. 7 and 8) extends between the first annular wall 22 and the second annular wall 24 parallel to the desired direction of the air flow 28—28 for providing additional support for the first annular wall 22.

Referring again to FIGS. 2A and 2B, the continuously curved surfaces 38 and 39 extend outwardly and downwardly into tangential intersection with the inner wall 47 of the shell 45 to smoothly direct the air flow 28—28 downwardly through an annular opening 76 (see also FIG. 3) at the end of the second annular return air duct 26 and into the first, annular return air duct 19. Because the flow rate of the air flow 43—43 in the first annular duct 19 is relatively low, and because the second annular return air duct 26 smoothly directs the air into the first annular duct 19, there is no tendency for the air to become turbulent such that the air flow 43-43 does not vibrate the walls 47 and 59.

Referring to FIGS. 2A, 2B and 4, the air flow 43—43 continues to the bottom 42 of the first duct 19, through a horizontal opening 77 and into the lower duct 34. The continuously curved surface 41 of the lower duct 34 smoothly turns the air flow 43 through ninety degrees (see arrow 40) for radial flow (see arrow 78) through a vertical, annular opening 79 of the lower duct 34 into the plenum 35. The air flows upwardly through the vents 58—58 in the divider 57 to establish the vertical air flow 36—36 so that the air flows smoothly across the manometer assembly 11.

Referring to FIG. 2B, the manometer assembly 11 is shown. While the assembly 11 can be of any conventional design, in the first preferred embodiment of the present invention the manometer assembly 11 is a dual cistern-type as shown in the U.S. Pat. No. 3,225,599 referred to above, with the improvements shown in FIG. 10.

A high vacuum line 80 is connected to the moving cistern 15 above the mercury pool (not shown). The moving cistern 15 is supported on a carrier 81 driven by a lead screw 82 journalled in bearings 83 supported on the column 14. The lead screw 82 is driven by a drive 84 that includes gears 85—85 and a shaft 86 that extends upwardly through holes 87 (FIG. 5) in the second, annular duct 26 to a motor 88. Since the shaft 86 is of small cross-section relative to that of the second annular duct 26, there is insignificant disturbance of the air flow 28 as a result of the shaft 86. A digital counter 89 (see FIG. 1) is also driven by the drive 84 to provide a direct reading in inches of the elevation of the moving cistern 15 above the fixed cistern 16.

FIG. 2B also illustrates in detail a mechanism 90 for raising and lowering the moving cistern 15 while maintaining desired accuracy and stability. The columns 14, 14', and 14" are mounted parallel to each other and vertically between the second semi-annular wall 24 and the base 55 of the enclosure 13. The columns 14, 14', and 14" are secured to the base 55 by suitable brackets 91. The base of each column 14, 14', and 14" includes a cylindrical section 92 fabricated from thermally insulating material. A nut 93 is secured to each cylinder 92 for receiving a machine screw 94 having a pad 95 at the end thereof. The machine screws 94 may be rotated to level the manometer assembly 11. The insulating sections 92 limit heat transfer from the pads 95 to and from the cylinders 14, 14' and 14".

As disclosed in the U.S. Pat. No. 3,225,599 referred to above, the columns 14, 14', and 14" are ground and polished to have a uniform diameter along their entire length. A collar 96 surrounds the column 14 and supports the carrier 81. The collar 96 is movable vertically along the column 14 and may be adjusted relative to the column 14 to maintain the movable cistern 15 parallel to a reference plane at any position along the column 14.

A threaded nut 97 is carried on the lead screw 82. Upward motion of the nut 97 drives the cistern 15 up the column 14 while downward motion of the nut 97 permits the cistern 15 to move downwardly. The nut 97 is secured to the collar 96 to prevent rotation of the nut 97 so that the nut 97 moves up and down as the lead screw 82 is rotated.

The mercury carrying line 17 and the high vacuum line 80 are supported by a pantograph 98 which is raised and lowered in synchronism with the movable cistern 15. The cistern 15 may move over a vertical range of one hundred inches or more requiring storage facilities for a considerable length of the lines 17 and 80 which must be handled without undue loading on the cistern driving mechanism 90 and without creating impedance to the flow of mercury between the cisterns 15 and 16. Electrical connections (not shown) to the movable cistern 15 may also be carried along the high vacuum line 80.

The pantograph 98 includes a plurality of arms 99—99 pivotally interconnected at their ends and at their crossing points. Two top arms 99—99 are pivotally mounted to a collar 100 and a bushing 101 which in turn slides vertically on the column 14'. A cable 102 is secured to the collar 100 at the upper end of the pantograph 98, passes over upper pulleys 103—103, over a lower pulley 104, and terminates at the collar 96 of the movable cistern 15. The cable 102 provides vertical motion of the upper end of the pantograph 98 along the column 14" in synchronism with the vertical motion of the collar 96 along the column 14.

In a typical manometer assembly, the movable cistern, such as the cistern 15, may contain a three inch diameter pool of mercury (not shown) and may be movable over a range of one hundred inches. This places considerable side loading on both the column, such as the column 14, and on the drive, such as the lead screw 82. Such side loading can tend to bow or bend the column 14 and the lead screw 82, which can cause the surface of the mercury in the pool to be out of level. To avoid such side loading and the resultant bowing, in a second preferred embodiment of the present invention shown in FIG. 10, two columns, such as the columns 14 and 14', are provided with a mechanism 105 for cooperatively supporting and moving the movable cistern 15. As shown in FIG. 10, the mechanism 105 includes a lead screw 82 provided for each of the columns 14 and 14' and a nut 97 secured to each carrier 81 that is connected to each collar 96. The collars 96 are movable vertically along the respective column 14 and 14' and may be adjusted so that the height of opposed support surfaces 106 may be vertically adjusted. The drive 84, including a drive belt 107, is connected to the same motor 88 as shown in FIG. 2A so that the lead screws 82 will be driven in synchronism for moving the nuts 97 up and down together.

In the second preferred embodiment the movable cistern 15 is mounted on a bridge 108 having shoulders 109 that hang over and are supported on the surfaces 106. The collars 96 are adjusted so that the bridge 107 is horizontal. In this manner, the movable cistern 15 supported on the bridge 108 will be horizontal for accurate operation. With the lead screws 82 driven in synchronism, the nuts 97 are moved vertically equal amounts so that the bridge 108 remains horizontal as it is moved vertically. With the collars 96—96 guided by the two columns 14 and 14' and the two lead screws 82 supporting and driving the mechanism 105 vertically, the side loading on the columns 14 and 14' and on the lead screws 82 is substantially reduced. As a result, the bowing of the columns 14 and 14' and of the lead screws 82 is reduced so that the bridge 108 stays horizontal and enables more accurate operation of the movable cistern 15.

The manometer assembly 11 may be used to provide the functions described in U.S. Pat. No. 3,225,599 referred to above. In performing such functions, the drive 84 is operated to rotate the lead screws 82 to cause the movable cistern 15 to move up or down relative to the fixed cistern 16. The cable 102 and the pulleys 103—103 and 104 move the pantograph 98 so that the lines 17 and 80 are properly supported. During such operation, the air flows vertically (as shown by the arrows 36—36 and 27—27) across the columns 14, 14', and 14" and across the cisterns 15 and 16, the pantograph 98, the lines 17 and 80 and the other structure of the manometer assembly 11. The blower 29 is operated at low speed such that outer tips 37—37 of the blades 33—33 have a relatively low speed so that blade-induced turbulence is minimized.

The horizontal cross-section of the measurement chamber 18 is large enough to permit steady, relatively laminar air flow upwardly in the measurement chamber 18 (see arrows 36—36 and 27—27) and around the manometer assembly 11, including the columns 14, 14', and 14", the cisterns 15 and 16 and the lines 17 and 80, to reduce the temperature gradient thereof with respect to the vertical location thereof in the measurement chamber 18. Further, the faired surface 31 of the hub 30, and the continuously curved surfaces 38 and 39 of the first and second annular walls 22 and 24 substantially reduce turbulence of the air flowing in the upper return air path 28—28 to the first annular return air duct 19. The air flows relatively smoothly in the lower return path (see arrows 40—40) from the duct 19 to the plenum 35 because of the continuously curved surface 41 of the lower duct 34 that starts at the bottom 42 of the first annular duct 19. As a result, relatively low turbulence is caused in the air paths 28—28 and 43—43 and in the lower air paths (see arrows 43—43 and 78—78). The air pressure is thus relatively steady in the plenum 35 so that the air flows smoothly in the vertical paths 36—36 upwardly from the plenum 35 across the manometer assembly 11.

While the preferred embodiment has been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed is:

1. In a manometer system including a manometer assembly for measuring pressure, the improvement comprising:
   chamber means for surrounding said manometer assembly and defining a cylindrical measurement chamber;
   cylindrical enclosure means coaxial with and surrounding said chamber means for defining a first annular return air duct, said enclosure means extending above and below said chamber means for defining respective upper and lower, closed enclosures sections;
   first annular means extending across said cylindrical enclosure means for separating said upper enclosure section from said measurement chamber, said first annular means having a central, disk-shaped section extending partially across said chamber means;
   second annular means secured to the top of said chamber means for cooperating with said first annular means to form a second annular return air duct having a continuously curved, inverted U-shape for directing air flowing upwardly in said measurement chamber outwardly and downwardly into said first return air duct; and
   blower means including a hub having a faired leading surface covering said disk-shaped section for guiding said upwardly flowing air into said second duct, said blower means including blades secured to said hub and extending across the opening to said second return air duct for drawing air upwardly around said hub and forcing it into said first duct, said lower closed enclosure section being connected to and receiving said forced air from said first return air duct and directing said air into said measurement chamber for flow across said manometer assembly to reduce the temperature gradient thereof with respect to the vertical location thereof in said measurement chamber.

2. A manometer system according to claim 1, wherein:
   said lower closed enclosure section includes a plate extending across the bottom of said measurement chamber to form a plenum, said lower closed enclosure section having curved walls for continuously guiding return air from said first return air duct into said plenum, said plate having openings therein for directing air from said plenum upwardly into said measurement chamber and across said manometer assembly.

3. A manometer system according to claim 2, wherein:
   said first and second annular means are walls each of which has a leading edge that guides and reduces the turbulence of said air forced into said second, semi-annular return air duct.

4. A manometer system according to claim 1, wherein:
   said manometer assembly includes a pair of columns extending vertically in said measurement chamber and supported by said second, semi-annular means;
   collar means having a section secured to each of said columns for movement therealong;
   bridge means connected to each said section of said collar means for defining a horizontal support surface;
   a cistern mounted on said support surface for carrying mercury; and
   means in said measurement chamber for moving said sections of said collar means in synchronism for varying the vertical location of said cistern in said measurement chamber.

5. In a manometer system including an elongated manometer assembly for measuring pressure, the improvement comprising:
   a hollow, elongated shell having a first cylindrical wall, and upper and lower sections connected to said wall to form a primary enclosure, said wall being insulated to limit conductive and radiation transfer of heat to said primary enclosure;
   a second cylindrical wall mounted in said primary enclosure concentrically with respect to and spaced from said first cylindrical wall for cooperating with said first cylindrical wall to form a first annular duct, said second cylindrical wall forming an inner cylindrical chamber for housing said manometer assembly;

a second annular duct adjacent said upper section, said second annular duct being formed from spaced, continuously curved walls and having a first horizontal annular opening for receiving air from said inner cylindrical chamber and having a second annular opening for discharging air into said first annular duct;

a bottom wall extending across said inner cylindrical chamber and being spaced from said lower section to form a plenum for receiving air from said first annular duct, said bottom wall having openings therein to permit air to flow from said plenum into said inner cylindrical chamber across said manometer assembly; and means for moving air from said inner cylindrical chamber to said first and second annular ducts, said air moving means including a drive mounted in said primary enclosure and having a drive shaft extending into said inner cylindrical chamber concentric with said first annular opening in said second annular duct, said air moving means further including propeller blade means mounted on said drive shaft and extending across said first horizontal annular opening for forcing air into said first horizontal annular opening, along said continuously curved walls of said second annular duct, through said first annular duct and through said plenum for discharge into said inner cylindrical chamber and flow across said manometer assembly to reduce the temperature gradient thereof along the length thereof.

6. A manometer system according to claim 5, wherein:

a third curved, annular duct is provided having a pair of annular openings positioned at right angles to each other for receiving air from said first annular duct and smoothly directing said air into said plenum; and said second annular duct has a generally inverted U-shaped cross-section between said first and second annular openings for smoothly directing air into said first annular duct.

7. A manometer system according to claim 5, in which:

said spaced walls of said second annular duct extend from said first annular opening and smoothly curve into tangential relation with said first cylindrical wall of said elongated shell for smoothly receiving upwardly flowing air from said inner cylindrical chamber and guiding said air in a continuously curved path for discharge downwardly into said first annular duct; and said propeller blade means is mounted horizontally across the top of said inner cylindrical chamber for forcing air from said inner cylindrical chamber upwardly into said second annular duct for continuous redirection outwardly and then downwardly into said first annular duct.

8. A manometer system according to claim 5, in which said elongated manometer assembly includes:

first and second columns supported vertically in said inner cylindrical chamber between said second annular duct and said bottom wall;

a first lead screw mounted parallel to and adjacent said first column;

a second lead screw mounted parallel to and adjacent said second column;

first collar means mounted on said first column for vertical movement in response to rotation of said first lead screw;

second collar means mounted on said second column for vertical movement in response to rotation of said second lead screw;

a bridge secured to each of said first and second collars and extending horizontally across said inner cylindrical chamber;

interconnected upper and lower cisterns in said inner cylindrical chamber, said upper cistern being mounted on said bridge for vertical movement therewith as said first and second lead screws rotate; and means for rotating said first and second lead screws in synchronism to vertically move said horizontal bridge.

9. In a manometer system including a measurement assembly formed from interconnected upper and lower cisterns, one of which is movable and the other being fixed, said cisterns carrying pools of mercury, and a line for interconnecting said cisterns, a first vertical column, a first lead screw positioned parallel to said first column, a first nut on said first lead screw, a first collar positioned about said first column and secured to said first nut to prevent rotation thereof, and means for rotating said first lead screw to cause said first collar to move vertically, the improvement comprising:

a measurement chamber for enclosing said measurement assembly, said chamber being formed from a hollow vertical cylinder having a vertical height from a top to a bottom at least equal to that of said measurement assembly and a diameter of sufficient amount to allow air to flow upwardly within said measurement chamber without substantial obstruction from said measurement assembly;

a hollow, elongated cylindrical shell enclosing said measurement chamber, said shell being spaced outwardly from and concentric with said vertical cylinder to form a first annular return air duct extending from said top to said bottom of said measurement chamber, said shell having a closed upper section extending above said top of said measurement chamber and a closed lower section extending below said measurement chamber;

a second annular return air duct having a first horizontal annular opening extending partially across said top of said measurement chamber for receiving air from said chamber, said second annular return air duct having a second horizontal annular opening for discharging air into said first annular return air duct, said second annular return air duct having a continuously curved path between said first and second annular openings;

a bottom wall extending across said bottom of said measurement chamber and being spaced from said closed lower section to form a plenum for receiving air from said first return air duct, said bottom wall having openings therein to permit air to flow from said plenum into said measurement chamber across said manometer assembly; and means for moving air through said measurement chamber, said air moving means including a drive mounted in said closed upper section and having a drive shaft extending into said measurement chamber concentric with said first annular opening of said second return air duct, said air moving means further including propeller blade means mounted on said drive shaft and extending across said first horizontal annular opening for forcing air upwardly through said first horizontal annular opening, through said second return air duct along said continuously curved path and through said first return air duct and said plenum for discharge into said measurement chamber and flow across said measurement assembly to reduce the temperature gradient along the length thereof.

10. A manometer system according to claim 9, wherein:
said second return air duct initially extends upwardly and then outwardly in said continuously curved path from said first annular opening for directing air in said continuously curved path from said measurement chamber into said first annular return air duct.

11. A manometer system according to claim 10, wherein:
said propeller blade means is mounted for rotation adjacent said top of said measurement chamber for drawing air upwardly out of said measurement chamber and through said first horizontal annular opening for continuous outward and then downward flow through said second return air duct into said first return air duct.

12. A manometer system according to claim 9, wherein:
said closed lower section of said shell has curved walls and extends from said first return air duct to said plenum for continuously directing air inwardly into said plenum so that air flows uniformly through said openings in said bottom wall and upwardly in said measurement chamber around said measurement assembly.

13. A manometer system according to claim 9, in which said measurement assembly further includes:
a second vertical column;
a second lead screw positioned parallel to said second column;
said columns and lead screws being mounted to and between said second annular return air duct and said bottom wall;
a second nut on said second lead screw;
a second collar positioned about said second column and secured to said second nut to prevent rotation thereof;
a bridge connected to each said collar and extending horizontally therebetween for carrying said movable cistern;
said rotating means also being effective to rotate said second lead screw in synchronism with rotation of said first lead screw so that said collars move vertically in synchronism and maintain said bridge horizontal

* * * * *